(12) United States Patent  
Gillead et al.

(10) Patent No.: US 9,391,787 B2  
(45) Date of Patent: Jul. 12, 2016

(54) TAGGING CONTENT FOR SOCIAL INTERCHANGE IN ONLINE EDUCATION PLATFORMS

(71) Applicant: Chegg, Inc., Santa Clara, CA (US)

(72) Inventors: Yehuda Gillead, Rehovot (IL); Shahaf Shakuf, Rehovot (IL); Vincent Le Chevalier, San Jose, CA (US); Roded Konforty, Rehovot (IL); Ohad Eder-Pressman, San Francisco, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 51 days.

(21) Appl. No.: 14/147,341

(22) Filed: Jan. 3, 2014

(65) Prior Publication Data

US 2015/0195095 A1    Jul. 9, 2015

(51) Int. Cl.
| | |
|---|---|
| *G06F 17/30* | (2006.01) |
| *H04L 12/18* | (2006.01) |
| *G06F 3/0484* | (2013.01) |
| *H04L 29/06* | (2006.01) |
| *H04L 29/08* | (2006.01) |
| *G06Q 50/00* | (2012.01) |

(52) U.S. Cl.  
CPC ........ *H04L 12/1822* (2013.01); *G06F 3/04842* (2013.01); *G06Q 50/01* (2013.01); *H04L 63/083* (2013.01); *H04L 67/02* (2013.01)

(58) Field of Classification Search  
CPC ... G06F 3/048; G06F 15/025; G06F 15/0291; G06F 17/21; G06F 17/30; G06F 17/048; G06F 17/241; G06F 17/0291  
USPC ...................... 726/7; 715/200, 205, 230, 776  
See application file for complete search history.

(56) References Cited

U.S. PATENT DOCUMENTS

| | | | | |
|---|---|---|---|---|
| 2005/0097186 | A1* | 5/2005 | Redpath ........................ | 709/217 |
| 2011/0066965 | A1* | 3/2011 | Choi ............................. | 715/776 |
| 2012/0254308 | A1* | 10/2012 | Habib et al. .................. | 709/204 |
| 2013/0046869 | A1* | 2/2013 | Jenkins et al. ................ | 709/223 |
| 2014/0067702 | A1* | 3/2014 | Rathod ......................... | 705/319 |

* cited by examiner

*Primary Examiner* — Joseph P Hirl  
*Assistant Examiner* — Kalish Bell  
(74) *Attorney, Agent, or Firm* — Fenwick & West LLP

(57) ABSTRACT

Disclosed is a computer-implemented method and system for tagging content for social interchange. When a user-generated post is received from a user device accessing a document from an online education platform for posting to an external social network, the system tags the user-generated post with a unique document-part identifier (ID) identifying a part of the document with which the post is associated. The document-part ID identifies the same part in both electronic and paper versions of the document. The post tagged by the document-part ID is posted to a live feed associated with the document-part ID on the external social network. User-generated posts from the live feed associated with the document-part ID on the external social network can be retrieved and displayed to the user.

18 Claims, 7 Drawing Sheets

TAGGING CONTENT FOR SOCIAL INTERCHANGE IN ONLINE EDUCATION PLATFORMS

BACKGROUND

1. Field of the Invention

This invention relates to tagging content for social interchange in online education platforms.

2. Description of the Related Art

The successful deployments of electronic textbook catalogs by digital education service providers have introduced multiple alternatives to the traditional print textbook marketplace. With the introduction of new and compelling online education services into well integrated publishing platforms, students and instructors alike have now access to a wide range of collaborative tools and solutions which are rapidly changing the way courses are taught and delivered. As the textbook remains, regardless of the print or digital format, the central knowledge repository of traditional academic courses, the proprietary nature of the online education platforms that deliver the textbooks and services has constrained the classroom collaborative environment and restricted social collaborations and interactions among users, which are critically important to users' learning experience, within each of these proprietary platforms.

As traditional courses are shifting from a static textbook-centric model to a connected one where related, personalized and other social content are being aggregated dynamically into the core academic material, it becomes strategic for online education platforms to be able to normalize these user-generated activities into new models of learning to overcome the proprietary nature of these platforms and their services.

SUMMARY

Embodiments disclose a computer-implemented method and system for tagging content for social interchange. The system receives a user-generated post from a user device accessing a document from an online education platform for posting to an external social network. The document comprises markup language page elements that collectively reconstruct the electronic documents with page fidelity to a corresponding paper document. In one embodiment, the system tags the user-generated post with a unique document-part identifier (ID) identifying a part of the document with which the post is associated. The document-part ID identifies the same part in both electronic and paper versions of the document. The post tagged by the document-part ID is posted to a live feed associated with the document-part ID on the external social network. The live feed associated with the document-part ID is formed from user-generated posts tagged by the document-part ID retrieved from the plurality of social networks. User-generated posts from the live feed associated with the document-part ID on the external social network can be retrieved by the system and displayed to the user.

In one embodiment, user-generated posts retrieved from the live feed associated with the document-part ID are displayed to the user in a dynamic stack of posts with the associated part of the document. Each post displayed in the dynamic stack comprises an identifier of a posting user and post content, which includes text, audio, video, URL or any combination thereof.

In one embodiment, the system can extract keywords and terms from documents and tag the keywords and terms with unique document-part IDs identifying parts from which the keywords and terms are extracted. The system then posts automatically the extracted keywords and terms to the live feeds identified by the document-part IDs.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention provide a system and a method for distributing live collaborative feeds. The method is organized around an educational digital publishing and reading platform (hereinafter referred to as "the digital publishing platform" or "the platform") configured to aggregate, manage, and distribute multilayered digital content. The digital document in modern markup language format can be accessed by general eReading browser applications (e.g., a HTML5 compatible browser) on a page by page basis and can be expanded to support a multilayered structure so as to incorporate supplemental content, such as dynamic listing of exercises and user-generated content in additional layers. Students and instructors can post, edit and share textbook page-centric user generated content that has been tagged with a unique document-part identifier through existing social networks. The unique document-part identifier (ID) identifies a part of the document with which the post is associated, and it is the same in both electronic and paper versions of the document. The post tagged by the document-part ID is posted to a live feed associated with the document-part ID on the external social network. The live feed associated with the document-part ID is formed from user-generated posts tagged by the document-part ID retrieved from the plurality of social networks.

Figure 1:
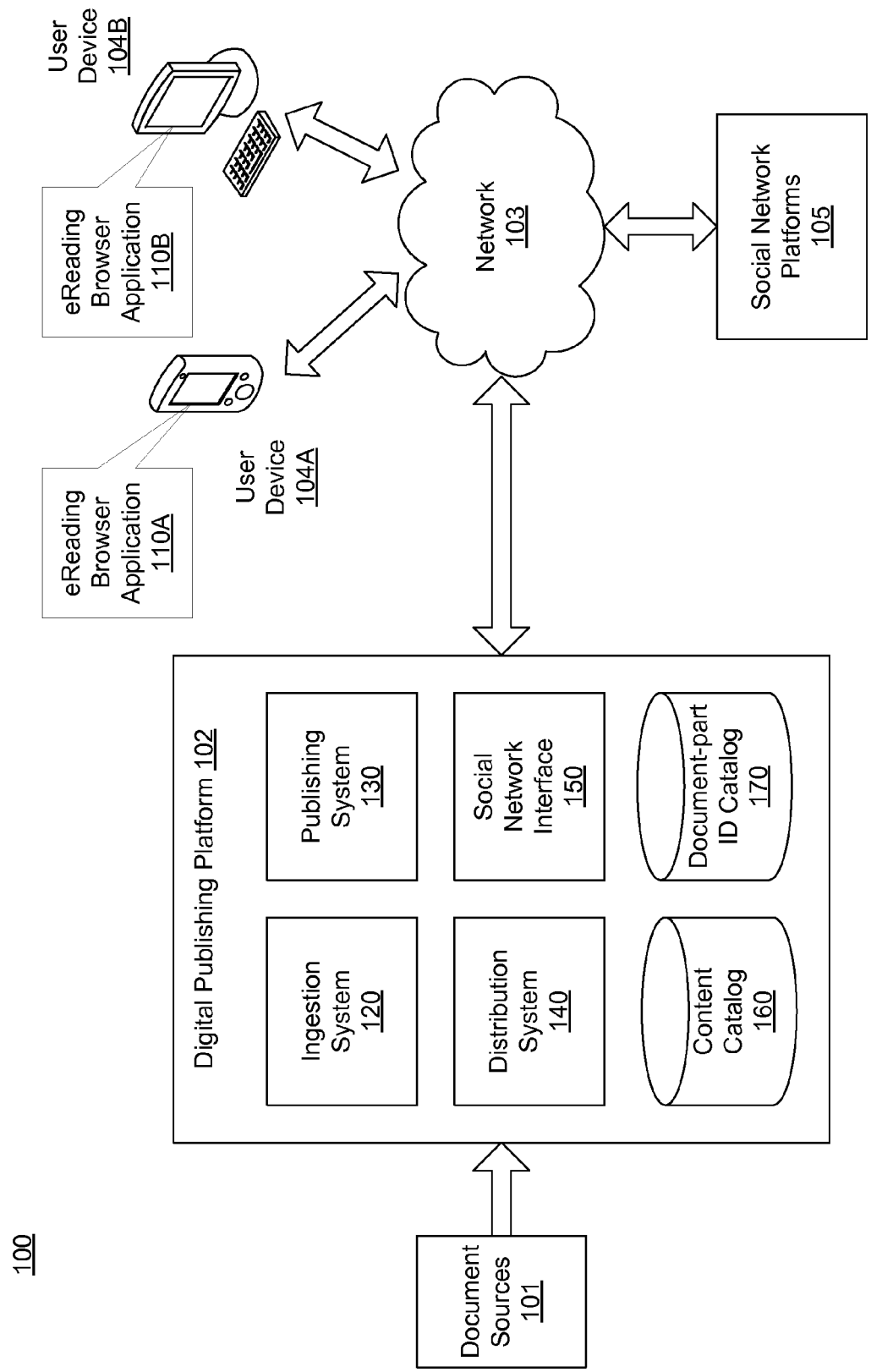
FIG. 1 is a block diagram illustrating an example digital publishing and online education environment, according to one embodiment.

FIG. 1 is a block diagram illustrating an example environment 100 for the digital publishing platform, which comprises document sources 101, a digital publishing platform 102, a network 103, user devices 104A, 104B (collectively 104), and a plurality of social network platforms 105. In one embodiment, the example environment illustrated in FIG. 1 is an educational digital publication and management platform integrating various course management services for instructors and students. For example, students may purchase or acquire electronic or paper course materials and textbooks through the educational platform, which integrates the students' studying and coursework with the course materials. Instructors may use the educational platform to access course materials, communicate with students or other instructors, and self-publish and distribute course materials. Furthermore, content is served dynamically and mostly on-demand in the platform. In one embodiment, the content is made available to end users through time-sensitive dedicated URLs which only stay valid for a limited time, for example a few minutes, all under control of the platform service provider.

Document sources 101 include digital and printed content gathered and aggregated from a large number of publishers, categories, and partners for the digital publishing platform 102. Examples of content include textbooks, trade books, magazines, newspapers, user-generated content, web content, and advertising content. Whether the content is curated, perishable, on-line, or personal, the publishing platform 102 defines the interfaces and processes to automatically collect various content sources into a formalized staging environment.

The digital publishing platform 102 aggregates, validates, transforms, packages, and monetizes the content from the document sources 101 into a number of services, prior to distribution to the user devices 104 over the network 103. The platform comprises a plurality of modules, such as an ingestion system 120, a publishing system 130, a distribution system 140, a social network interface 150, a content catalog 160, and a document-part identifier (ID) catalog 170. Other embodiments may include different and/or fewer or more modules.

The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the ingested document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document.

The content catalog 160 is the central repository of all content published by the publishing system 130. Content items in the content catalog 160 may be indexed and associated with metadata describing related documents, a user associated with the content, and access conditions for the content. If a content item is related to a foundation document, the content item is indexed in the content catalog 160 with an identifier of the related foundation document. User-generated content items may be further indexed by an identifier of the user who created the content. For example, user-generated notes may be indexed by the document with which the notes are associated and the user who created the notes. Access conditions, which may be specified by an owner or author of content or a service, indicate which users can access the content and/or how access to the content may be authorized.

In one embodiment, the publishing system 130 reconstructs licensed textbooks in print or digital formats into markup language format that preserve the original page structure. Each of the reconstructed markup language pages maintains a perfect or near perfect fidelity to the original printed or equivalent digital version (e.g., a PDF page). The preserved page structure include pagination, number of columns and arrangement of paragraphs, placement and appearance of graphics, titles and captions, and fonts used, regardless of the original format of the source content and complexity of the layout of the original document. During reconstruction, document metadata describing a product description, pricing, and terms (e.g., whether the content is for sale, rent, or subscription, or whether it is accessible for a certain time period or geographic region, etc.) are also added to the reconstructed document.

Since the page structure information of reconstructed markup language document is identical to the corresponding printed or equivalent digital textbook, the content of the reconstructed textbook can be indexed using a unique document-part ID scheme across platforms regardless of the document formats. In one embodiment, the document-part ID is a combination of a unique document ID and page-based position inside a document. For example, as a result of this document reconstruction for a hardcopy textbook, an international standard book number (ISBN) coupled with a page number can be established to index content of the textbook for both the printed textbook and markup language version reconstructed by the publishing system 130.

The document-part ID catalog 170 is the repository of all document-part ID established by the publishing system 130. If a user-generated content item is related to a document, the content item can be tagged with a document-part ID of the related document part found in the document-part ID catalog 170. For example, a user-generated content item, such as a comment, a question, or a post, may be automatically tagged by a document-part ID identifying a page in a book with which the content item is associated. In one embodiment, the user-generated content indexed by the associated document-part IDs are stored in the content catalog 160.

The distribution system 140 packages content for delivery, uploads the content to content distribution networks, and makes the content available to end users based on the content digital rights management policies. In one embodiment, the distribution system 140 includes digital content management, content delivery, and data collection and analysis subsystems.

The distribution system 140 may also aggregate additional content layers from numerous sources into the ingested or reconstructed document. These layers, including related content, advertising content, social content, and user-generated content, may be added to the document to create a dynamic, multilayered document. For example, social content may be uploaded to the publishing platform by a user or his or her social connections (e.g., classmates, teachers, authors, etc.). Examples of social content include interactions between users related to the document and content shared by members of the user's social network. In one embodiment, user-generated content may be posted by a user to external social network platforms, where the user is an existing member.

The social network interface 150 serves as a bridge between the digital publishing platform 102 and the social network platforms 105. The social network platforms 105 may be created and managed by the digital publishing platform 102, or can be existing external social network systems, such as TWITTER, FACEBOOK and LINKEDIN. The social network interface 150 can authenticate users of the digital publishing platform 102 to the social network platforms 105 so users may interact and share their content and experience on the social network platforms 105. For each individual user, the social network interface 150 can also automatically discover and filter user-generated content from the social network platforms 105 and present it, for example, as a live feed to the user based on a document-part ID associated with the user-generated content. Through the social network interface 150, users of the digital publishing platform 102 may interact with each other, sharing user-generated content, commenting on classes, textbooks or exercises, and collaborating on projects and activities.

Communication between the publishing platform 102, user devices 104, and the social network platforms 105 is enabled by network 103. The network 103 is typically a content delivery network (CDN) built on the Internet, but may include any network, including but not limited to a LAN, a MAN, a WAN, a mobile wired or wireless network, a private network, or a virtual private network. In one embodiment, the network 103 uses standard communications technologies and/or protocols. Thus, the network 103 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 103 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 103 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The user devices 104 access content from the digital publishing platform 102 through eReading browser applications 110 running on the user devices connected to the network 103. The user devices 104 include a personal computer, such as a desktop, laptop, or tablet computer, a personal digital assistant, a mobile or smart phone, a set-top box, or any other device including computing functionality and data communication capabilities. Although only two user devices 104A and 104B are shown in FIG. 1, any number of user devices 104 may communicate with the publishing platform 102 to access the content distributed by the publishing platform 102. In one embodiment, each user is associated with an account on the publishing platform 102, and content purchased by users through the publishing platform 102 is made available through the user account. Furthermore, a user may access and interact with the multilayered content synchronously on a plurality of devices 104.

Contrary to other existing digital publishing services, the publication platform 102 allows users to access content without downloading any specific reading application from the publisher. Rather, the eReading browser applications 110A and 110B (collectively 110) construct document pages using structureless HTML5 elements downloaded from the publishing platform 102. The eReading browser applications 110 comprise eReading applications as well as supplemental applications that function in the browser environment to support the user's eReading activities and overall engagement with the multilayered documents distributed by the publishing platform 102, such as live feed applications, social applications, and testing applications. For example, the eReading browser application 110 may post user-generated content to the social network platforms 105.

Figure 2:
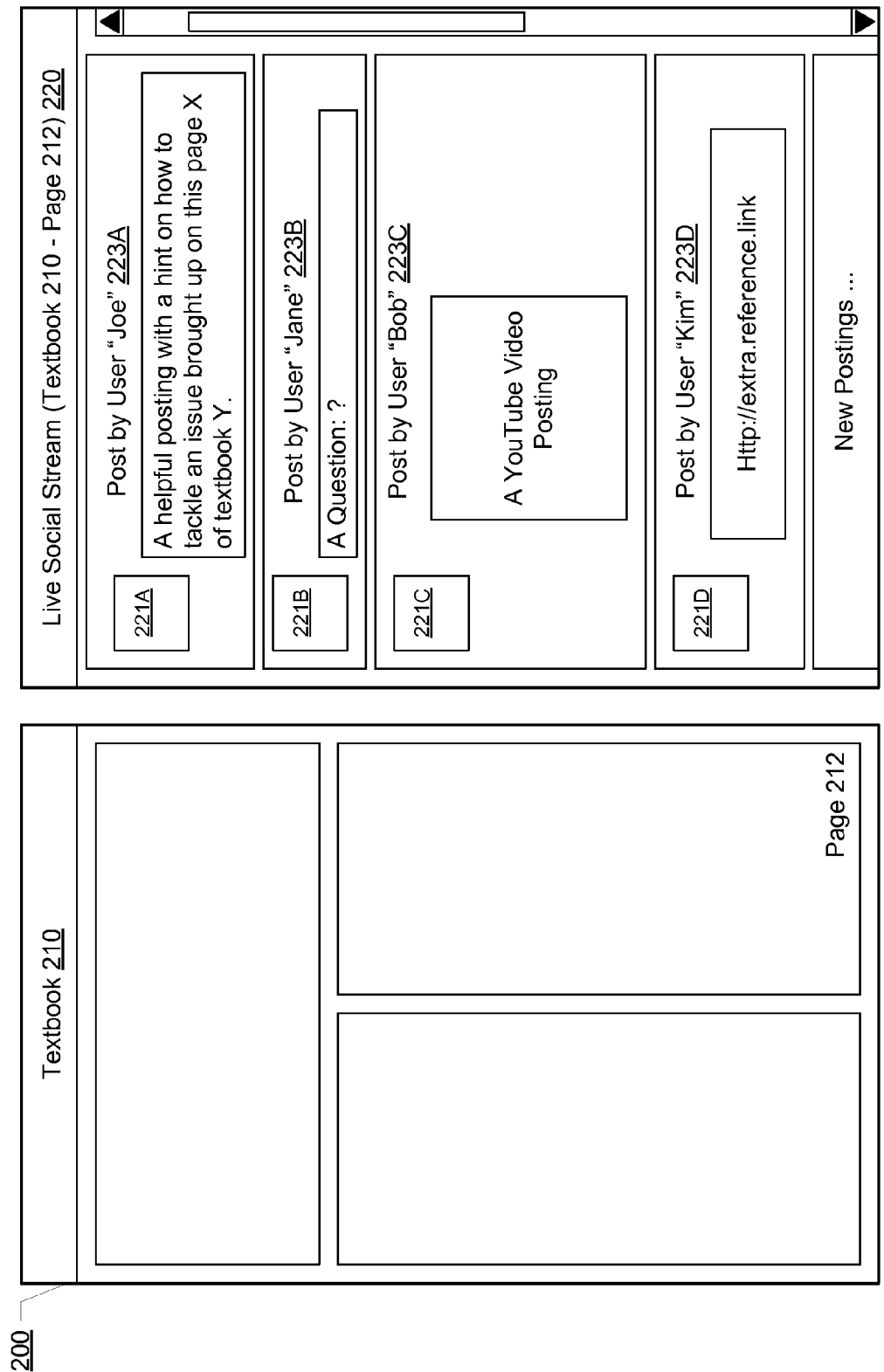
FIG. 2 is a block diagram illustrating an eReading environment with live social stream, according to one embodiment.

FIG. 2 illustrates an eReading environment 200 with live social feed, according to one embodiment. The eReading environment demonstrates the aggregation of user posted content on social network platforms into live feed for a particular page of a textbook. The live social feed may be presented to users in a variety of formats. An eReading browser application 110 can display the live social feed in a panel adjacent to a page of the document with which the live feed are associated. Based on the document-part ID of the book page that the user is reading, the eReading browser application 110 may synchronize the presentation of the live feed. For example, as illustrated in FIG. 2, the textbook panel on the left side displays a book page 212 of a textbook 210 currently being read by a user, while the right side panel displays a live social feed 220 associated with the book page. The live social feed 220 is tagged with a unique document-part ID, in this example, (Textbook 210-Page 212). The live social feed 220 is organized into a dynamic stack of individual posting boxes 221A-221D, each includes its post content and information on its respective owner or posting user, such as users 223A-223D.

The live social feed typically includes a variety of content types, such as text (e.g., user comments or questions) in posts 221A and 221B, embedded multimedia (e.g., images, audio or video clips) in post 221C, and web links (e.g., URLs) in post 221D. As described above, the unique document-part ID identifies a particular book part regardless of the book format, be it printed or digital version. Therefore, the live social feed is accessible across multiple platforms: when users are reading a printed textbook, or when registered users reading digital versions of the same textbook through the digital publishing platform 102. In one embodiment, when a user is reading a printed copy of the textbook, the live social feed 220 may provide a user interface for the user to select a book and page number or any other means to enter the document-part ID that the user would like to receive live social feed. Alternatively, when the user is accessing the book page through the eReading browser application, the live social feed 220 can be displayed to the user automatically based on the book page 212 the user is reading.

The live social feed panel 220 also allows user to post comments, questions, multimedia, or web links to the live social feed associated with the document-part ID. The eReading browser application 110 tags the user-generated content items with the current document-part ID and upload the content items to the digital publishing platform 102, which post the content items to the social network platforms 105 through the social network interface 150. The live social feed 220 may provide another user interface for the user to select which target social network platforms for posting the content item, and optionally request the user to enter credentials for login to the selected social network platforms. Besides the document-part ID, the user-generated content items may carry other metadata describing user activities leading to the creation of the content item, such as the user who created the note, the time the content item was created, and the type of content within the content item (e.g., text, image, or multimedia).

Example Computer System

Figure 3:
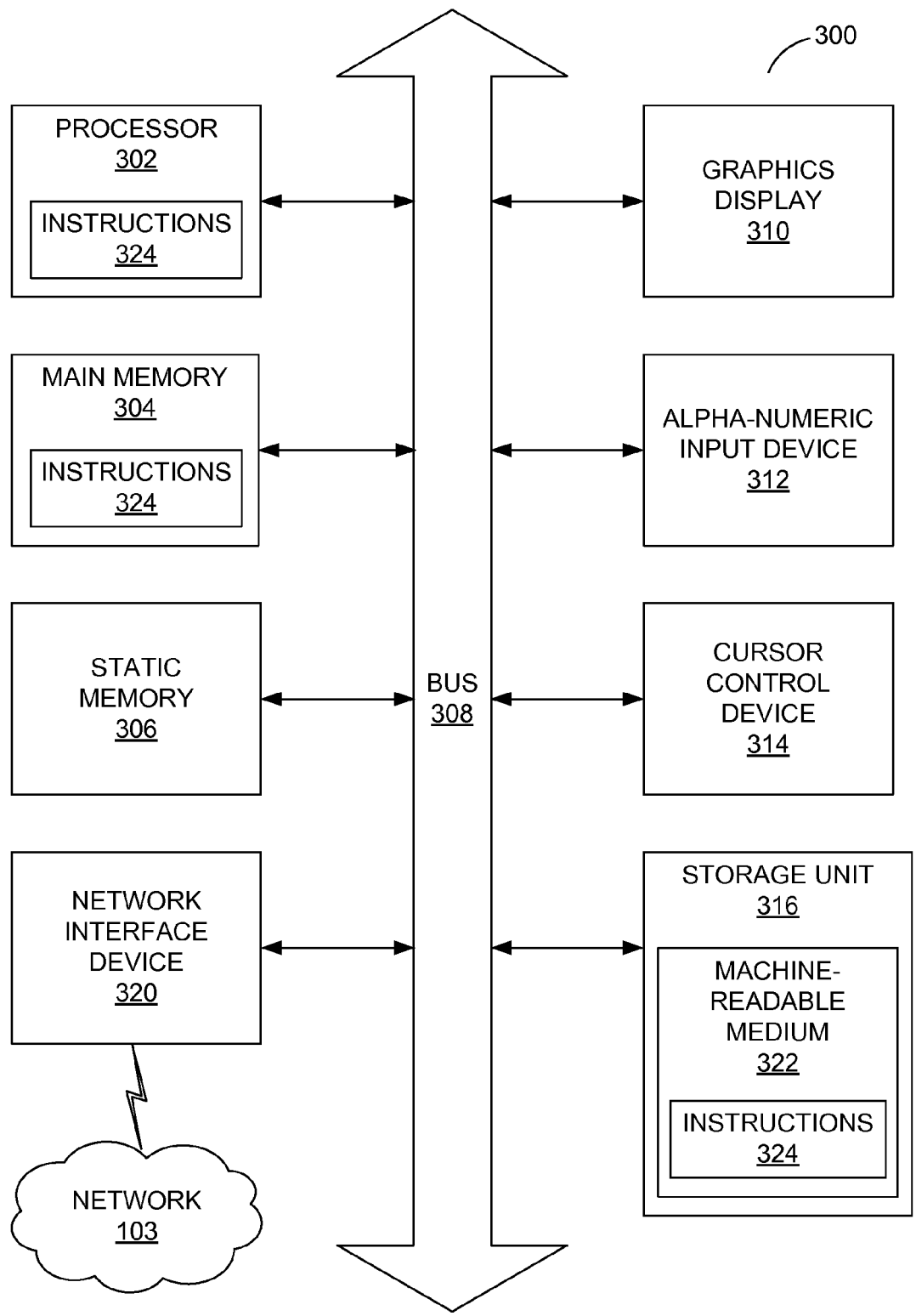
FIG. 3 is a block diagram illustrating a computer for use as client devices and platform servers, according to one embodiment.

FIG. 3 is a block diagram illustrating components of an example computer able to read instructions from a machine-readable medium and execute them in a processor (or controller) to implement the disclosed systems for tagging content for social interchange in online education platforms, such as the user devices 104 and servers for the digital publishing platforms 102 and/or social network platforms 105 in the example publishing and online education environment 100 shown in FIG. 1. Specifically, FIG. 3 shows a diagrammatic representation of a machine in the example form of a computer system 300 within which instructions 324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processors 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, and a network interface device 140, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 103 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Social Network Interface

Figure 4:
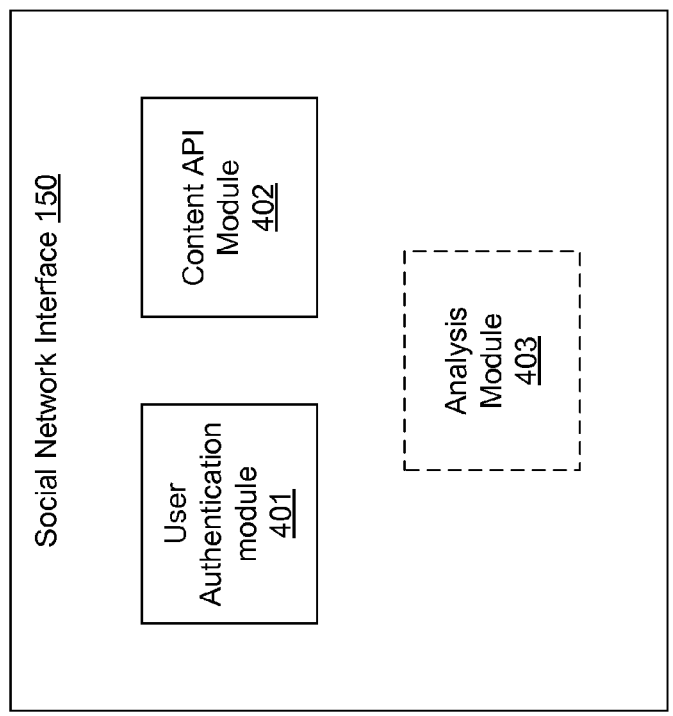
FIG. 4 is a block diagram illustrating modules within a social network interface, according to one embodiment.

FIG. 4 is a block diagram illustrating modules within a social network interface 150. In one embodiment, the social network interface comprises a user authentication module 401, a content API module 402, and an optional analysis module 403. Other embodiments of the social network interface 150 may include different and/or fewer or more modules.

The user authentication module 401 authenticates registered users of the digital publishing platform 102 who would like to post user-generated content items to targeted social network platforms 105 through content API module 402. In one embodiment, a registered user of the digital publishing platform 102 may link his account at the digital publishing platform 102 to his individual accounts at any social network platforms 105 of his or her choice, so that the user is automatically authenticated by the targeted social network platforms 105 once the user logs on to the digital publishing platform 102. Alternatively, the user authentication module 401 may coordinate with the eReading browser applications 110 running on user devices 104 to authenticate the user on-demand whenever the user is accessing the live feed. For example, the eReading browser applications 110 may prompt the user to enter his or her credentials to the targeted social network platforms 105 in a user interface, which passes the user credentials to the user authentication module 401 of the social network interface 150.

Once users are authenticated, the content API module 402 handles the bi-directional flow of live social feed between the digital publishing platform 102 and the targeted social network platforms 105. In one embodiment, the user-generated content items tagged with a unique document-part ID are automatically posted to the target social network platforms 105 and join the social network content sphere. The content API module 402 also collaborates with the social network platforms 105 to filter and import user-generated content items from the social network content sphere and presents the imported posts to users based on their tagged document-part IDs. In case of a temporary disruption in connectivity between the digital publishing platform 102 and the social network platforms 105 (e.g., the user authentication fails), the user-generated content items tagged with specific document-part IDs can be stored temporarily by the digital publishing platform 102 in the content catalog 160 and posted to the social network platforms 105 when connectivity resumes.

The social network interface 150 optionally includes an analysis module 403, which analyzes and mines user-generated content items in the live social feed posted by users to the social network platforms 105. In one embodiment, the analysis module 403 examines the bi-directional live feed content on the fly. Alternatively, the user-generated content items posted by users and imported from the social network platforms 105 may be stored to the digital publishing platform 102 for offline analysis by the analysis module 403. The user-generated content items in the live social feed can be analyzed and mined to discover user behaviors, such as time consumed in the social network platforms, as well as to provide feedback to instructors and authors alike from students on their comments, questions, and performances, etc.

Document-Part ID

As described above, the document-part ID is established by the digital publishing platform 102 that reconstructs printed or digital textbooks into markup language page documents while preserving page-fidelity. For example, a textbook processed by this document reconstruction process maintains an identical document page structure between the original print format, the PDF digital format, and the reconstructed HTML5 page format. As a result, the content of a particular textbook can be universally indexed by a combination of its unique document ID and page-based position information within the document page structure across multiple formats.

In one embodiment, the document-part ID comprises a unique document ID coupled with a location index within the document. Content associated with an individual page or section of the document, such as user-generated content items resulting from direct user interactions with the page or section of the document, can then be readily indexed by the document-part ID. This is particularly important in education, as the user-generated content (UGC) needs to be accessible and shared among all users of the same textbook in a collaborative environment, such as in a classroom or a virtual classroom.

Figure 5:
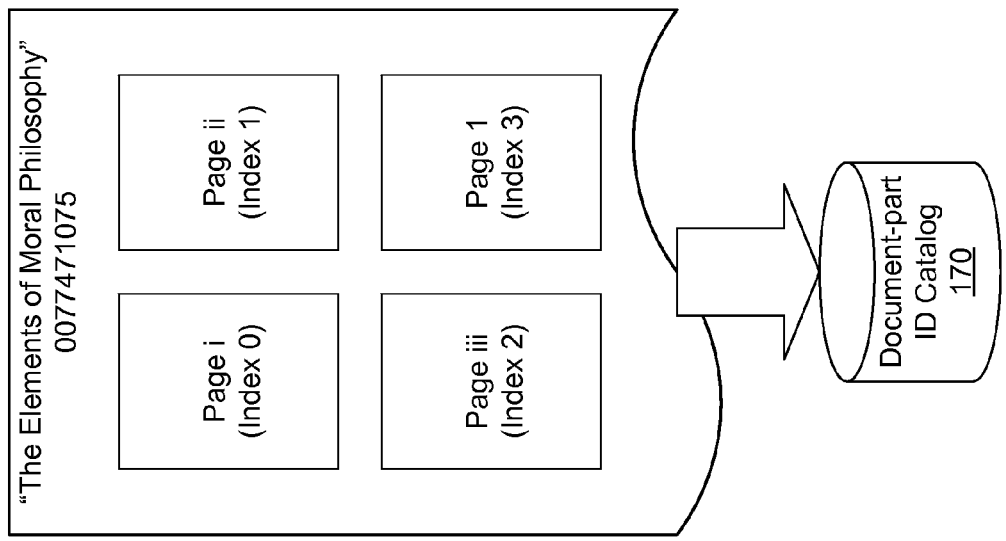
FIG. 5 is a block diagram illustrating an example of the unique document-part IDs, according to one embodiment.

FIG. 5 illustrates an example of the unique document-part IDs, according to one embodiment. In this example, the unique document-part ID stored in the document-part ID catalog 170 comprises a combination of a unique document ID and individual page index. The published book titled "The Elements of Moral Philosophy" has an ISBN number "0077471075" for its print edition (or an eISBN number for an electronic edition). Each page in the book has been assigned a unique index number, for example, page i has an index 0, page ii has an index 1, and so on. Therefore, the document page ID for page 1 can be represented as (0077471075-3) among other combination strings. Following the page-fidelity reconstruction process by the digital publishing platform 102, the reconstructed HTML5 format of the book shares identical page structures and identical document-part IDs as the printed version.

Content API

Figure 6:
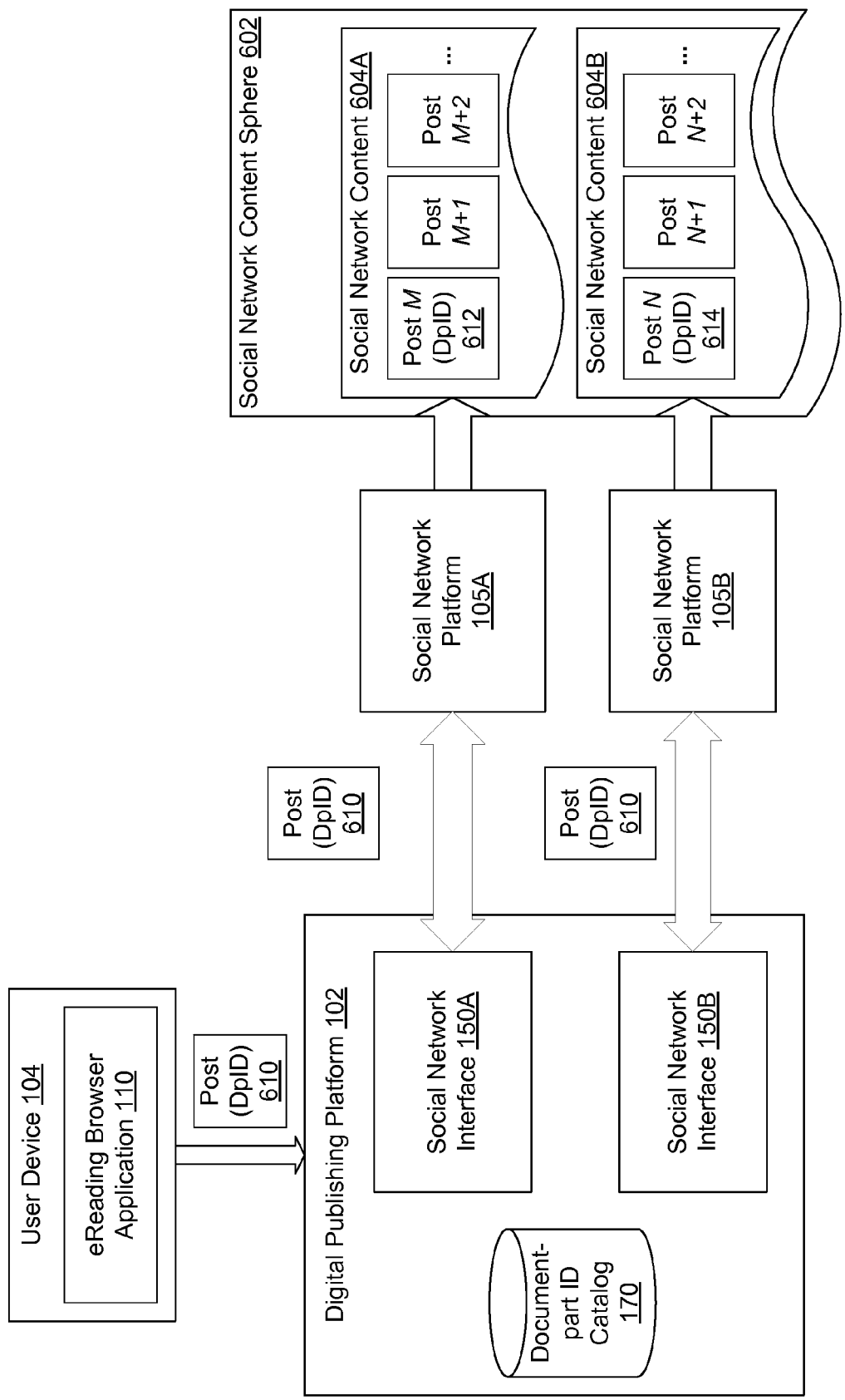
FIG. 6 is a block diagram illustrating an example data flow from a digital publishing platform to external social network platforms, according to one embodiment.

The social network interface 150 handles the bi-directional flow of live social feed between the digital publishing platform 102 and the targeted social network platforms 105. FIG. 6 illustrates an example data flows from the digital publishing platform 102 to external social network platforms 105, according to an embodiment. In FIG. 6, the social network interfaces 150 serve as bridging systems between the digital publishing platform 102 and external social network platforms 105 using universal document-part IDs. Although only two social network interfaces 150A and 150B are shown to bridge social network platforms 105A and 105B, respectively, any number of social network platforms can be supported. Each of the social network interfaces 150 is connected to a social network platform through specific content API and user authentication modules designed for the corresponding social network platform. The social network interfaces 150 ensure that different social network platforms support the same universal document-part IDs established by the digital publishing platform 102.

The interactions between the digital publishing platform 102, eReading browser application 110, and social network platforms 105 to post a user-generated content item are illustrated in FIG. 6. The process begins when a registered user of the digital publishing platform 102 is accessing an electronic textbook from a connected user device 104 running the eReading browser application 110. The digital publishing platform 102 integrates the document-part ID compatible social network interfaces 150 as bridges to user selected 3rd party social networks platforms 150, such as Twitter or Facebook, for automatically exporting or importing live social feed to and from these platforms. Each social network interface is architected around a pair of content API and authentication modules designed for the interfacing social network platform.

From the eReading browser application 110, registered users typically interact with specific HTML pages of the licensed electronic textbook while adding user-generated content such as highlights, notes, and other comments. Through live social feed interface, such as the live social feed panel 220 illustrated FIG. 2, the user-generated content can be marked by the registered users for posting to selected social network platforms. Once created, the user-generated content, for example, the post 610, can be automatically tagged by a unique document-part ID (DpID) identifying the book page with which the content is associated. In one embodiment, the eReading browser application 110 may interact with the document-part ID catalog 170 to corroborate the document-part ID tag.

The user-generated post 610 with DpID is then uploaded to the digital publishing platform 102 where it is processed by the social network interfaces 150. By processing the user post 610 with DpID, each social network interface 150 separately authenticates that the owner of the posted content has a valid account with the targeted social network platform 105. After successful authentication, post 610 with DpID is uploaded to social network platforms 105 and joined with corresponding social network content 604 in social network content sphere 602. For example, post 610 with DpID becomes post M with DpID 612 in the social network content 604A, and post N with DpID 614 in the social network content 604B.

The social network interfaces 150 is also configured to import live social feed from social network content sphere 602 into the digital publishing platform 102, which can then distribute and synchronize the live feed to the eReading browser applications 110 that are accessing the page of the electronic textbook identified by the document-part ID associated with the imported user posts. For example, the live social feed retrieved by the digital publishing platform 102 through the social network interface 150 is assembled and can be presented in a separate panel 220 alongside the to the page 212 of the electronic textbook 210 in FIG. 2. The live social feed panel 220 is structured as a stack of post boxes, each box encapsulates one of the user-generated posts imported through the content API module of the social network interface 150. To keep the live feed updated, the eReading browser application 110 regularly synchronizes with the digital publishing platform 102 through the content API module, which is receiving live posts from the social network platforms 105. This implementation enables the live feed content tagged by document-part IDs to flow back and forth between the eReading browser application 110 and each of the targeted social network platforms 105.

As long as a digital publishing platform supports the universal document-part ID, the digital publish platform can tap into the existing social network content sphere to import live social feeds through its own proprietary document-part ID compatible social network interfaces. A user post tagged with a document-part ID can be posted by a user to social network content sphere 602 though any digital publishing platforms or directly via social network platforms. A user post tagged with the document-part ID in the social network content sphere 602 can also be imported by any digital publishing platforms implementing the document-part ID structure. For instance, a digital publishing platform, which publishes a catalog of PDF textbooks, is able to access the same live social feed for a document-part ID as a platform that publishes a similar catalog of page-fidelity markup language documents. By publishing the document-part ID content API to other platforms and service providers and openly sharing the document-part ID structure, a truly agnostic social collaborative platform can be created to provide live social feeds to all readers, regardless of proprietary platforms document formats.

Figure 7:
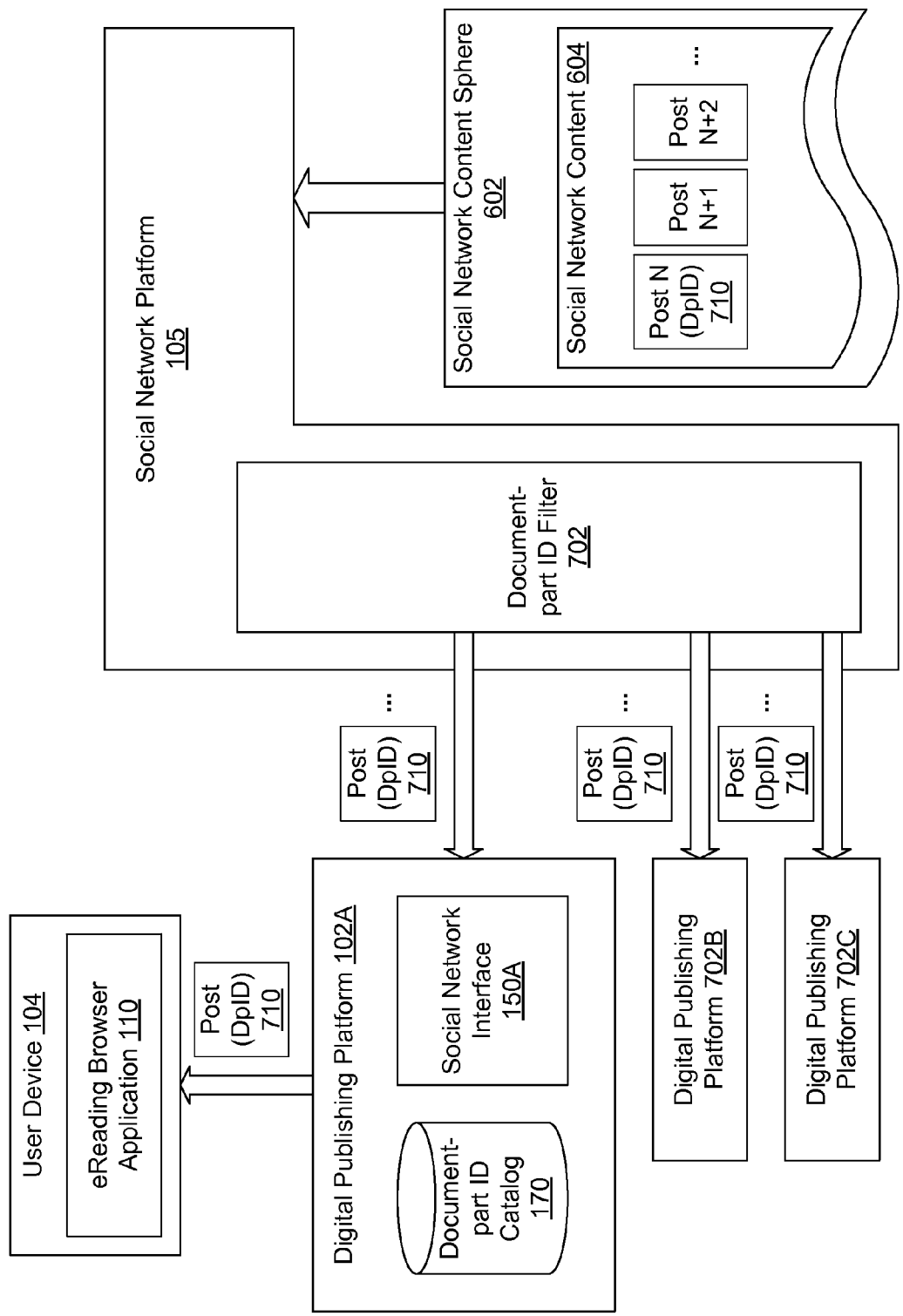
FIG. 7 is a block diagram illustrating an example data flow from external social network platforms to digital publishing platforms, according to one embodiment.

FIG. 7 is a block diagram illustrating an example data flow from external social network platforms to digital publishing platforms, according to one embodiment. As illustrated in FIG. 7, three different digital publishing platforms 102A, 702B and 702C are interfaced with social network platform 105 through their respective social network interfaces 150A, all designed around the universal document-part IDs. Any number of publishing platforms can be supported. User-generated content, such as post N with DpID 710, which is posted by a user to the social network content sphere 604, becomes universally indexed and searchable by its tagged document-part ID, thus can be filtered by a document-part ID filter 702 and assembled into distinct live social feed into different digital publishing platforms, such as platform 102.

In one embodiment, the document-part ID filter 702 is implemented inside the social network platforms 105 as illustrated in FIG. 7. In other implementations, it is implemented external to the social networking platform, and in yet other implementations, it may reside within the digital publishing platforms 102A, 702B, and 702C. When a user-generated content item gets posted with a built-in unique document-part ID, the document-part ID filter 702 automatically identifies the unique document-part ID in order to aggregate the posts and assemble them into a live feed in reference to its unique document-part ID. Once a particular document-part ID filtering is active within the social network content sphere, all the posts that carry the specific document-part ID, as well as any incoming ones, are automatically added to the live stream for that document-part ID. In other embodiments, the document-part ID filter 702 can also filter user-generated content based on various criteria, such as time stamp, user/owner identification, and other keywords besides the document-part ID.

In one embodiment, the digital publishing platform 102 may initiate automated postings of content with document-part IDs without user interference. For example, an individual terms listing or other glossary is extracted from a licensed textbook and associated with corresponding document-part IDs. The content of each of these terms and their definitions is forwarded to the social network interface 150 content APIs and automatically posted to the targeted social network platforms 105 after successful authentication. In order to automate the posting, the digital publishing platform 102 registers itself as a publisher and a user of the licensed documents from its content catalog 160 and preemptively posing document-part ID content on targeted social network platforms 105. By doing so, any users of the targeted social network platforms are able to search and access document-part ID specified content, even if they never posted any document-part ID content directly.

Interactions of Systems

Figure 8:
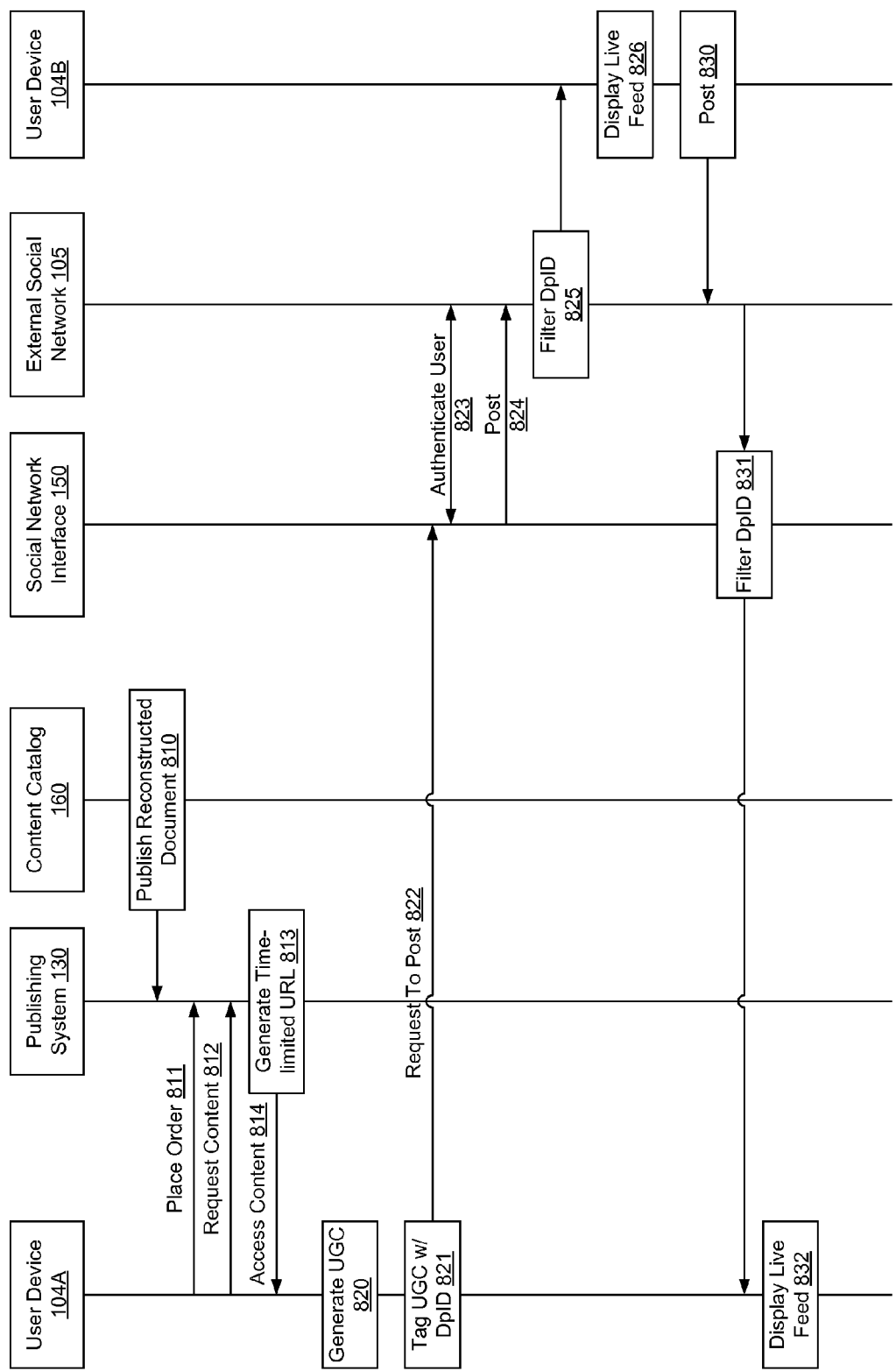
FIG. 8 is an interaction diagram illustrating a process for distributing a live social feed, according to one embodiment.

FIG. 8 is an interaction diagram illustrating a process for distributing live social feed, according to one embodiment. In this example, six entities are involved in the publishing of the personalized digital document: user devices 104A and 104B, the publishing system 130, the content catalog 160, the social network interface 150, and the external social network 105. Other embodiments may include different and/or more or less entities, and the steps of the process may be performed in different orders.

As a document is digitally ingested and reconstructed into markup language format by the digital publishing platform, the reconstructed document is stored in the content catalog 160 and published 810 by the publishing system 130. When a registered user places an order 811 for the published document at the publishing system 130 via the user device 104A, the order is processed and user authenticated. Upon authentication and validation, a license for the ordered markup language document is created, granting the user access to the document. The user device 104A is then authenticated to request access 812 the digital document from the publishing system 130, which generates 813 one or more time-limited URLs so the user device 104A may access the document pages for the ordered document. The user device 104A then access 814 the document on a page-by-page basis using eReading browser applications running on his or her connected devices through authenticated web sessions.

While reading a licensed document page, the user creates 820 a user-generated content (UGC) item and determines to post the UGC item to a target external social network 105 via user device 104A. The UGC item is then automatically tagged 821 with a document-part ID (DpID) that uniquely identifies the document and the page with which the UGC item is associated by the eReading browser application running on the user device. The request to post the UGC item is forwarded 822 to the social network interface 150, which interacts with the target social network 105. With the help from the social network interface 150, the user device 104A is authenticated 823 at the external social network 105. After successful authentication, the UGC item with DpID is posted 824 on to the external social network 105. The UGC item with DpID is identified and aggregated to a live social feed for the DpID at the social network 105. A DpID filter inside the social network 105 then forwards the UGC item with DpID to another user who is operating the user device 104B and by any means retrieving the live social feed associated with the DpID. For example, the user operating user device 104B may be reading the same document and same page through the same or different digital publishing platforms. The UGC item with DpID is then displayed 826 as an update of the live feed to user device 104B.

Subsequently, the user of user device 104B may post 830 his or her UGC item to the same or different social network. The post from the user device 104B is identified by the social network interface 150 content API through document-part ID or other keywords as associated with the document and page that user of user device 104A is reading. For example, the user of the user device 104B may post an answer to a previous question posted by user of the user device 104A, or a comment directly to his or her TWITTER account with an explicit hashtag (#DpID) identifying the page of the document. In this example, the social network interface 150 filters and import 831 the UGC item from the user device 104B and pushes it to the user device 104A. The UGC item from the user device 104B is displayed 832 as a latest update to the live social feed for the DpID.

In conclusion, the disclosed system and method tags user-generated content with a unique document-part ID and automatically posts the user-generated content to user selected social networks for the creation of live conversation streams associated with specific sections or pages of electronic documents. The system analyzes content catalog to establish the unique document-part IDs and automatically captures user-generate content with document-part IDs for posting to external social networks from eReading browser applications. The system also synchronizes between the education platforms and the social networks for automated exporting and importing of user-generated content tagged with document-part IDs. The system can also search the social networks for crowd-sourced content embedded with the document-part IDs. Imported user-generated content is filtered to form live conversations for specific sections or pages of electronic documents and present these live conversations or feeds in users' eReading browser applications.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method of tagging content for social interchange, the method comprising:
   receiving a user-generated post from a user device accessing a document from an online education platform for posting to an external social network;
   tagging, by a processor, the post with a unique document-part identifier (ID) identifying a part of the document with which the post is associated, the document-part ID identifying the same part in both electronic and paper versions of the document;
   posting the post tagged by the document-part ID to a live feed associated with the document-part ID on the external social network;
   extracting keywords and terms from the document;
   tagging the keywords and terms with unique document-part IDs identifying parts from which the keywords and terms are extracted;
   posting automatically the keywords and terms to live feeds identified by document-part IDs;
   retrieving one or more posts from the live feed associated with the document-part ID on the external social network; and
   providing for display the one or more posts to the user.

2. The method of claim 1, wherein the document-part ID comprises a unique identifier of the document combined with a unique index to the part of the document.

3. The method of claim 1, further comprising:
   authenticating user credentials with the external social network, the user credentials comprising user login and password for the external social network, and the user credentials stored by the online education platform.

4. The method of claim 1, wherein the user-generated post tagged by the document-part ID is posted to a plurality of social networks.

5. The method of claim 1, wherein the live feed associated with the document-part ID is formed from user-generated posts tagged by the document-part ID retrieved from a plurality of social networks.

6. The method of claim 1, wherein the retrieved one or more posts from the live feed associated with the document-part ID are filtered based on the document-part ID by the external social network.

7. The method of claim 1, wherein the retrieved one or more posts from the live feed associated with the document-part ID are displayed to the user in a dynamic stack of posts with the associated part of the document, each post displayed in the dynamic stack comprising an identifier of a posting user and post content, the post content including text, audio, video, URL or any combination thereof.

8. The method of claim 1, further comprising:
interfacing with other digital publishing platforms based on the same document-part ID.

9. The method of claim 1, further comprising:
responsive to a temporary disruption in connectivity between the online education platform and the external social network platform, storing the user-generated post at the online education platform.

10. A computer system for tagging content for social interchange, the system comprising:
a processor for executing computer program instructions; and
a non-transitory computer-readable storage medium storing executable computer program instructions, the computer program instructions comprising code for:
receiving a user-generated post from a user device accessing a document from an online education platform for posting to an external social network;
tagging, by a processor, the post with a unique document-part identifier (ID) identifying a part of the document with which the post is associated, the document-part ID identifying the same part in both electronic and paper versions of the document;
posting the post tagged by the document-part ID to a live feed associated with the document-part ID on the external social network;
extracting keywords and terms from the document;
tagging the keywords and terms with unique document-part IDs identifying parts from which the keywords and terms are extracted;
posting automatically the keywords and terms to live feeds identified by document-part IDs;
retrieving one or more posts from the live feed associated with the document-part ID on the external social network; and
providing for display the one or more posts to the user.

11. The system of claim 10, wherein the document-part ID comprises a unique identifier of the document combined with a unique index to the part of the document.

12. The system of claim 10, wherein the computer program instructions further comprise code for:
authenticating user credentials with the external social network, the user credentials comprising user login and password for the external social network, and the user credentials stored by the online education platform.

13. The system of claim 10, wherein the user-generated post tagged by the document-part ID is posted to a plurality of social networks.

14. The system of claim 10, wherein the live feed associated with the document-part ID is formed from user-generated posts tagged by the document-part ID retrieved from a plurality of social networks.

15. The system of claim 10, wherein the retrieved one or more posts from the live feed associated with the document-part ID are filtered based on the document-part ID by the external social network.

16. The system of claim 10, wherein the retrieved one or more posts from the live feed associated with the document-part ID are displayed to the user in a dynamic stack of posts with the associated part of the document, each post displayed in the dynamic stack comprising an identifier of a posting user and post content, the post content including text, audio, video, URL or any combination thereof.

17. The system of claim 10, wherein the computer program instructions further comprise code for:
interfacing with other digital publishing platforms based on the same document-part ID.

18. The system of claim 10, the computer program instructions further comprise code for:
responsive to a temporary disruption in connectivity between the online education platform and the external social network platform, storing the user-generated post at the online education platform.

\* \* \* \* \*